(12) United States Patent
Varadharajan (10) Patent No.: US 9,069,901 B2
(45) Date of Patent: Jun. 30, 2015

(54) SOFTWARE AND FRAMEWORK FOR REUSABLE AUTOMATED TESTING OF COMPUTER SOFTWARE SYSTEMS

(75) Inventor: Arunkumaran Varadharajan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 621 days.

(21) Appl. No.: 12/909,820

(22) Filed: Oct. 21, 2010

(65) Prior Publication Data

US 2012/0047489 A1    Feb. 23, 2012

Related U.S. Application Data

(60) Provisional application No. 61/375,217, filed on Aug. 19, 2010.

(51) Int. Cl.
*G06F 9/44* (2006.01)
*G06F 11/36* (2006.01)

(52) U.S. Cl.
CPC .............. *G06F 11/3672* (2013.01); *G06F 8/30* (2013.01)

(58) Field of Classification Search
CPC ..................... G06F 11/3604; G06F 11/3624
USPC .......................................................... 717/125
See application file for complete search history.

(56) References Cited

U.S. PATENT DOCUMENTS

| | | |
|---|---|---|
| 5,072,370 A | 12/1991 | Durdik |
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,787,437 A | 7/1998 | Potterveld et al. |
| 5,794,232 A | 8/1998 | Mahlum et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,941,947 A | 8/1999 | Brown et al. |
| 5,950,190 A | 9/1999 | Yeager et al. |
| 5,963,953 A | 10/1999 | Cram et al. |
| 5,974,409 A | 10/1999 | Sanu et al. |
| 5,987,471 A | 11/1999 | Bodine et al. |
| 6,002,869 A * | 12/1999 | Hinckley ..................... 717/124 |

(Continued)

OTHER PUBLICATIONS

Jeffrey Brown, Change Chart Type by Using Data Validation, 2009.*

(Continued)

*Primary Examiner* — Li B Zhen
*Assistant Examiner* — Lenin Paulino
(74) *Attorney, Agent, or Firm* — Ingrassia Fisher & Lorenz, P.C.

(57) ABSTRACT

Methods, software, frameworks, and systems for automating test procedures for a computer processing system. An embodiment of the method includes steps of determining a plurality of available automated test procedures, determining a plurality of available test options, and generating a plurality of test specifications. Each test specification may include option data corresponding to one of the available test options as well as procedure data corresponding to one of the available automated test procedures. The present invention advantageously supports reuse and extensibility of automated test procedures for a variety of configurations.

20 Claims, 7 Drawing Sheets

(56) References Cited

U.S. PATENT DOCUMENTS

| | | |
|---|---|---|
| 6,064,656 A | 5/2000 | Angal et al. |
| 6,085,191 A | 7/2000 | Fisher et al. |
| 6,092,083 A | 7/2000 | Brodersen et al. |
| 6,112,198 A | 8/2000 | Lohman et al. |
| 6,169,534 B1 | 1/2001 | Raffel et al. |
| 6,178,425 B1 | 1/2001 | Brodersen et al. |
| 6,189,000 B1 | 2/2001 | Gwertzman et al. |
| 6,189,011 B1 | 2/2001 | Lim et al. |
| 6,216,135 B1 | 4/2001 | Brodersen et al. |
| 6,219,667 B1 | 4/2001 | Lu et al. |
| 6,226,641 B1 | 5/2001 | Hickson et al. |
| 6,233,617 B1 | 5/2001 | Rothwein et al. |
| 6,233,618 B1 | 5/2001 | Shannon |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,330,560 B1 | 12/2001 | Harrison et al. |
| 6,336,137 B1 | 1/2002 | Lee et al. |
| 6,341,288 B1 | 1/2002 | Yach et al. |
| 6,345,288 B1 | 2/2002 | Reed et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,438,562 B1 | 8/2002 | Gupta et al. |
| 6,446,089 B1 | 9/2002 | Brodersen et al. |
| 6,446,109 B2 | 9/2002 | Gupta |
| 6,453,038 B1 | 9/2002 | McFarlane et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,578,037 B1 | 6/2003 | Wong et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,148 B1 | 8/2003 | Salo et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,658,417 B1 | 12/2003 | Statukis et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,721,765 B2 | 4/2004 | Ghosh et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,839,680 B1 | 1/2005 | Liu et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,944,133 B2 | 9/2005 | Wisner et al. |
| 6,947,927 B2 | 9/2005 | Chaudhuri et al. |
| 7,076,633 B2 | 7/2006 | Tormasov et al. |
| 7,152,109 B2 | 12/2006 | Suorsa et al. |
| 7,174,483 B2 | 2/2007 | Becher et al. |
| 7,185,192 B1 | 2/2007 | Kahn |
| 7,206,805 B1 | 4/2007 | McLaughlin, Jr. |
| 7,206,807 B2 | 4/2007 | Cheenath |
| 7,209,929 B2 | 4/2007 | Dominguez, Jr. et al. |
| 7,249,118 B2 | 7/2007 | Sandler et al. |
| 7,305,577 B2 | 12/2007 | Zhang |
| 7,308,704 B2 | 12/2007 | Vogel et al. |
| 7,340,411 B2 | 3/2008 | Cook |
| 7,350,237 B2 | 3/2008 | Vogel et al. |
| 7,373,364 B1 | 5/2008 | Chapman |
| 7,448,079 B2 | 11/2008 | Tremain |
| 7,484,219 B2 | 1/2009 | Mitra |
| 7,529,728 B2 | 5/2009 | Weissman et al. |
| 7,577,092 B2 | 8/2009 | San Andres et al. |
| 7,580,975 B2 | 8/2009 | Cheenath |
| 7,599,953 B2 | 10/2009 | Galindo-Legaria et al. |
| 7,620,655 B2 | 11/2009 | Larsson et al. |
| 7,661,027 B2 | 2/2010 | Langen et al. |
| 7,693,820 B2 | 4/2010 | Larson et al. |
| 7,698,160 B2 | 4/2010 | Beaven et al. |
| 7,734,608 B2 | 6/2010 | Fell et al. |
| 7,769,825 B2 | 8/2010 | Karakashian et al. |
| 7,774,366 B2 | 8/2010 | Fisher et al. |
| 7,779,039 B2 | 8/2010 | Weissman et al. |
| 7,814,052 B2 | 10/2010 | Bezar et al. |
| 7,814,470 B2 | 10/2010 | Mamou et al. |
| 7,827,138 B2 | 11/2010 | Salmon et al. |
| 7,849,401 B2 | 12/2010 | Elsa et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0023440 A1 | 9/2001 | Franklin et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0133392 A1 | 9/2002 | Angel et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015578 A1 | 1/2004 | Karakashian et al. |
| 2004/0015981 A1 | 1/2004 | Coker et al. |
| 2004/0027388 A1 | 2/2004 | Berg et al. |
| 2004/0044656 A1 | 3/2004 | Cheenath |
| 2004/0045004 A1 | 3/2004 | Cheenath |
| 2004/0059420 A1 | 3/2004 | Michelson |
| 2004/0111410 A1 | 6/2004 | Burgoon et al. |
| 2004/0128001 A1 | 7/2004 | Levin et al. |
| 2004/0143819 A1* | 7/2004 | Cheng et al. ............ 717/125 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0220952 A1 | 11/2004 | Cheenath |
| 2004/0249854 A1 | 12/2004 | Barnes-Leon et al. |
| 2004/0260534 A1 | 12/2004 | Pak et al. |

(56) References Cited

U.S. PATENT DOCUMENTS

| | | | |
|---|---|---|---|
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0120276 A1* | 6/2005 | Kolawa et al. | 714/38 |
| 2005/0166094 A1* | 7/2005 | Blackwell et al. | 714/38 |
| 2005/0283478 A1 | 12/2005 | Choi et al. | |
| 2006/0095960 A1 | 5/2006 | Arregoces et al. | |
| 2006/0100912 A1 | 5/2006 | Kumar et al. | |
| 2006/0136382 A1 | 6/2006 | Dettinger et al. | |
| 2007/0043980 A1* | 2/2007 | Ohashi et al. | 714/45 |
| 2007/0078705 A1 | 4/2007 | Abels et al. | |
| 2007/0088741 A1 | 4/2007 | Brooks et al. | |
| 2007/0124276 A1 | 5/2007 | Weissman et al. | |
| 2007/0130130 A1 | 6/2007 | Chan et al. | |
| 2007/0130137 A1 | 6/2007 | Oliver et al. | |
| 2007/0150546 A1 | 6/2007 | Karakashian et al. | |
| 2007/0226640 A1 | 9/2007 | Holbrook et al. | |
| 2007/0271483 A1* | 11/2007 | Kolawa et al. | 714/38 |
| 2008/0010243 A1 | 1/2008 | Weissman et al. | |
| 2008/0082540 A1 | 4/2008 | Weissman et al. | |
| 2008/0082572 A1 | 4/2008 | Ballard et al. | |
| 2008/0082986 A1 | 4/2008 | Cheenath et al. | |
| 2008/0086358 A1 | 4/2008 | Doshi et al. | |
| 2008/0086447 A1 | 4/2008 | Weissman et al. | |
| 2008/0086479 A1 | 4/2008 | Fry et al. | |
| 2008/0086482 A1 | 4/2008 | Weissman et al. | |
| 2008/0086514 A1 | 4/2008 | Weissman et al. | |
| 2008/0086567 A1 | 4/2008 | Langen et al. | |
| 2008/0086735 A1 | 4/2008 | Cheenath et al. | |
| 2008/0162544 A1 | 7/2008 | Weissman et al. | |
| 2008/0201701 A1 | 8/2008 | Hofhansl et al. | |
| 2008/0215560 A1 | 9/2008 | Bell et al. | |
| 2008/0270354 A1 | 10/2008 | Weissman et al. | |
| 2008/0270987 A1 | 10/2008 | Weissman et al. | |
| 2009/0030906 A1 | 1/2009 | Doshi et al. | |
| 2009/0049065 A1 | 2/2009 | Weissman et al. | |
| 2009/0049101 A1 | 2/2009 | Weissman et al. | |
| 2009/0049102 A1 | 2/2009 | Weissman et al. | |
| 2009/0049288 A1 | 2/2009 | Weissman et al. | |
| 2009/0192761 A1* | 7/2009 | Pearl | 702/182 |
| 2009/0254883 A1* | 10/2009 | Munson et al. | 717/124 |
| 2009/0276395 A1 | 11/2009 | Weissman et al. | |
| 2009/0276405 A1 | 11/2009 | Weissman et al. | |
| 2009/0282045 A1 | 11/2009 | Hsieh et al. | |
| 2009/0319529 A1 | 12/2009 | Bartlett et al. | |
| 2010/0191719 A1 | 7/2010 | Weissman et al. | |
| 2010/0205216 A1 | 8/2010 | Durdik et al. | |
| 2010/0211619 A1 | 8/2010 | Weissman et al. | |
| 2010/0223284 A1 | 9/2010 | Brooks et al. | |
| 2010/0235837 A1 | 9/2010 | Weissman et al. | |
| 2010/0274779 A1 | 10/2010 | Weissman et al. | |

OTHER PUBLICATIONS

Jeffrey Brown ("Change Chart Type by Using Data Validation" 2009).*

[Online]; [published on Oct. 17, 2008]; [retrieved on Feb. 26, 2010]; retrieved from http://en.wikipedia.org/wiki/Push_technology.

[Online]; [published on Oct. 16, 2008]; [retrieved on Feb. 26, 2010]; retrieved from http://en.wikipedia.org/wiki/Customer_Relationship_Management.

[Online]; [published on Apr. 22, 2008]; [retrieved on Feb. 26, 2010]; retrieved from http://en.wikipedia.org/wiki/Flat_file_database.

[Online]; [published on Apr. 25, 2008]; [retrieved on Feb. 26, 2010]; retrieved from http://en.wikipedia.org/wiki/Relational_database.

First named inventor: Yancey, Scott, U.S. Appl. No. 12/636,658, filed Dec. 11, 2009.

First named inventor: Yancey, Scott, U.S. Appl. No. 12/636,675, filed Dec. 11, 2009.

First named inventor: Doshi, Kedar, U.S. Appl. No. 12/167,991, filed Jul. 3, 2008.

First named inventor: Bezar, Eric, U.S. Appl. No. 12/569,603, filed Sep. 2, 2010.

First named inventor: Yancey, Scott, U.S. Appl. No. 12/132,409, filed Jun. 3, 2008.

First named inventor: Durdik, Paul, U.S. Appl. No. 12/549,349, filed Aug. 27, 2009.

Lee et al: "Composition of executable business process models by combining business rules and process flows", Expert Systems With Application, Oxford, GB, vol. 33, No. 1, Dec. 22, 2006, pp. 221-229.

Mietzer et al: "Combining Different Multi-tenancy Patterns in Service Oriented Applications", IEE International Enterprise Distributed Object Computing Conference, NJ, USA, Sep. 1, 2009, pp. 131-140.

Wang et al: "Integrated Constraint Violation Handling for Dynamic Services Composition", IEE International Conference on Services Computing, NJ, USA, Sep. 21, 2009, pp. 168-175.

Wermelinger et al: "Using coordination contracts for flexible adaptation to changing business rules", Proceedings of the Sixth International Workshop on Software Evolution, NJ, USA, Sep. 1, 2003, pp. 115-120.

Wang et al: "A Study and Performance Evaluation of the Multi-Tenant Data Tier Design Patterns for Service Oriented Computing", IEE International Conference on E-Business Engineering, NJ, USA, Oct. 22, 2008, pp. 94-101.

Notification of Transmittal of the International Search Report and the Written Opinion of the International Searching Authority, or the Declaration. International Application No. PCT/US2010/050021. International Filing Date: Sep. 23, 2010.

First named inventor: Yancey, Scott, U.S. Appl. No. 12/197,979, filed Aug. 25, 2008.

First named inventor: Calahan, Patrick, U.S. Appl. No. 12/954,556, filed Nov. 24, 2010.

First named inventor: Pin, Olivier, U.S. Appl. No. 12/895,833, filed Sep. 30, 2010.

First named inventor: Tanaka, Jay, U.S. Appl. No. 12/831,196, filed Jul. 6, 2010.

First named inventor: Press, William A., U.S. Appl. No. 12/850,502, filed Aug. 4, 2010.

First named inventor: Tanaka, Jay, U.S. Appl. No. 12/831,209, filed Jul. 6, 2010.

First named inventor: Williams, Alexis, U.S. Appl. No. 13/028,236, filed Feb. 16, 2011.

* cited by examiner

SOFTWARE AND FRAMEWORK FOR REUSABLE AUTOMATED TESTING OF COMPUTER SOFTWARE SYSTEMS

CROSS REFERENCE TO RELATED PATENT APPLICATIONS

The present application claims priority to U.S. provisional patent application No. 61/375,217 filed Aug. 19, 2010 entitled CUSTOMIZED REPLICATION OF LEGACY TEST SUITES identifying Arunkumaran Varadharajan as inventor.

BACKGROUND

The present invention generally relates to automated testing of computer software systems. More specifically, embodiments of the present invention pertain to reusable and customizable software, frameworks, and systems for automated testing.

In computer programming, unit testing is a method by which individual units of source code are tested to determine if they are fit for use. A "unit" is conventionally the smallest testable part of an application. In procedural programming a unit may be an individual function or procedure. Ideally, each test case is independent from the others: substitutes like method stubs, mock, objects, fakes and test harnesses can be used to assist testing a module in isolation. Unit tests are typically written and run by software developers to ensure that code meets its design and behaves as intended. Its implementation can vary from being very manual (pencil and paper) to being formalized as part of build automation.

The goal of unit testing is to isolate each part of the program and show that the individual parts are correct. A unit test provides a strict, written contract that the piece of code must satisfy. As a result, it affords several benefits. Unit tests find problems early in the development cycle. The procedure is to write test cases for all functions and methods so that whenever a change causes a fault, it can be quickly identified and fixed. Readily-available unit tests make it easy for the programmer to check whether a piece of code is still working properly.

Test-driven development (TDD) is a software development process that relies on the repetition of a very short development cycle: first the developer writes a failing automated test case that defines a desired improvement or new function, then produces code to pass that test and finally refactors the new code to acceptable standards. The tests contain assertions that are either true or false. Passing the tests confirms correct behavior as developers evolve and refactor the code. Developers often use testing frameworks, such as JUnit for Java-based software, NUnit for Microsoft .Net-based software, to create and automatically run sets of test cases. Various automated testing frameworks have come to be known collectively as xUnit. These frameworks allow testing of different units of software, such as functions and classes. The main advantage of xUnit frameworks is that they provide an automated solution with no need to write the same tests many times, and no need to remember what should be the result of each test.

Most of the legacy features in a test-driven development organization are accompanied by an extensive suite of comprehensive tests validating and verifying their behavior. The automated tests validate and verify the behavior of the system as it is developed. In addition, existing tests provide valuable regression coverage to ensure that extensions, bug fixes, and other modifications do not break existing functionality. However, many existing tests may be applicable to new features and new configurations, so a framework to support reuse and extensibility of automated test procedures for a variety of configurations is desirable.

DETAILED DESCRIPTION

Figure 1:
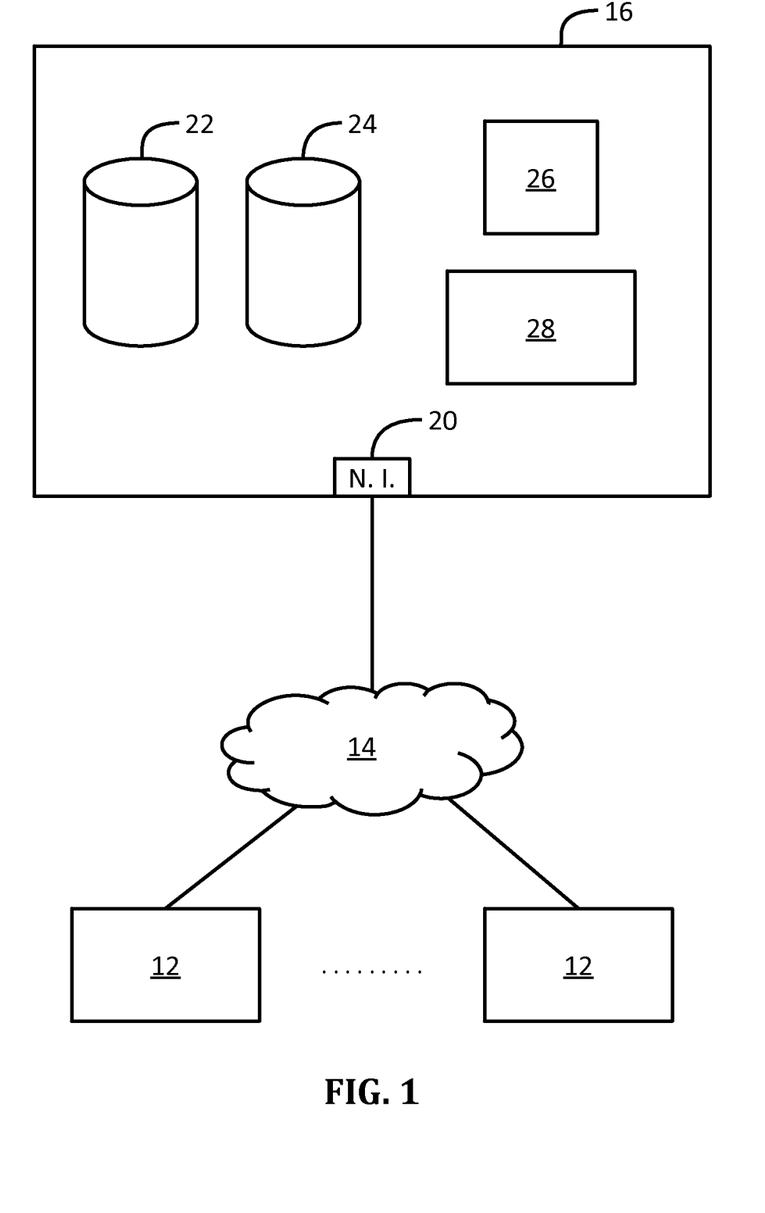
FIG. 1 illustrates an environment wherein a multi-tenant database system (MTS) might be used according to one embodiment.
Figure 2:
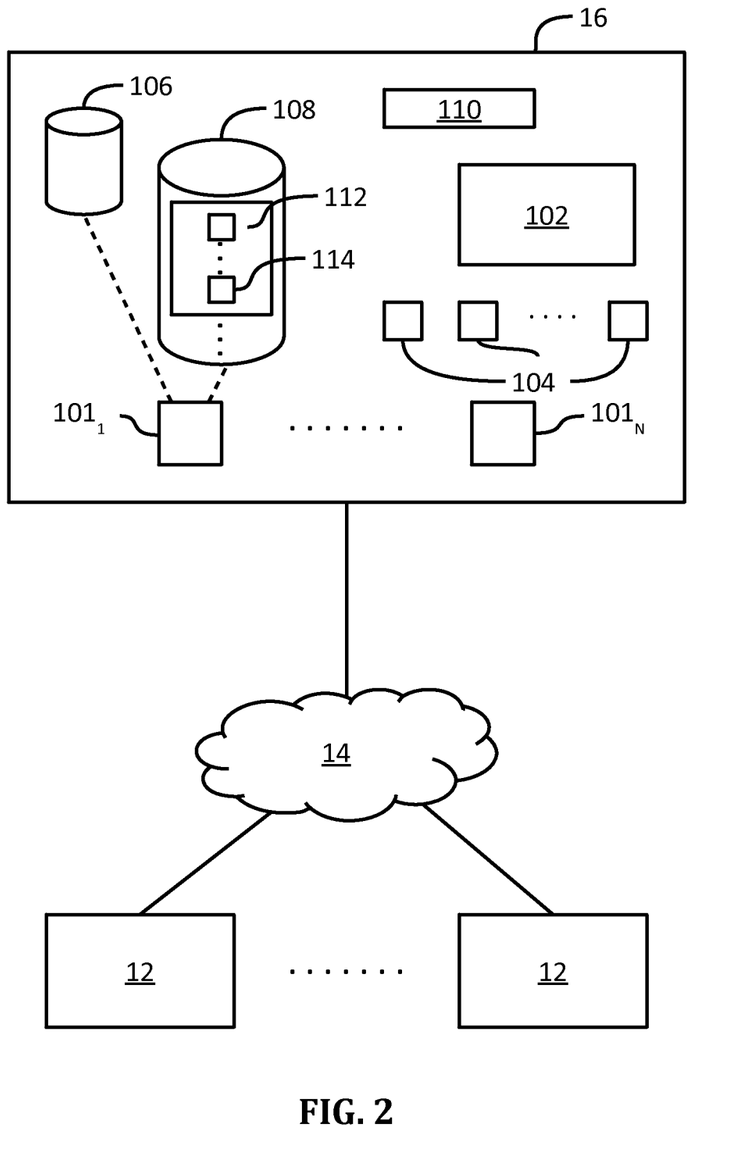
FIG. 2 illustrates elements of an MTS and interconnections therein in more detail according to one embodiment.

FIG. 1 and FIG. 2 show exemplary computer systems where an easily extensible and customizable test framework is advantageous. FIG. 1 illustrates an environment wherein a multi-tenant database system might be used. As illustrated in FIG. 1 (and in more detail in FIG. 2) any user systems 12 might interact via a network 14 with a multi-tenant database system (MTS) 16. The users of those user systems 12 might be users in differing capacities and the capacity of a particular user system 12 might be entirely determined by the current user. For example, where a salesperson is using a particular user system 12 to interact with MTS 16, that user system has the capacities allotted to that salesperson. However, while an administrator is using that user system to interact with MTS 16, that user system has the capacities allotted to that administrator.

Network 14 can be a LAN (local area network), WAN (wide area network), wireless network, point-to-point network, star network, token ring network, hub network, or other configuration. As the most common type of network in current use is a TCP/IP (Transfer Control Protocol and Internet Protocol) network such as the global internetwork of networks often referred to as the "Internet" with a capital "I," that will be used in many of the examples herein, but it should be understood that the networks that the present invention might use are not so limited, although TCP/IP is the currently preferred protocol.

User systems 12 might communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such HTTP server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least as for the users that are accessing that server.

In preferred aspects, the system shown in FIG. 1 implements a web-based customer relationship management (CRM) system. For example, in one aspect, MTS 16 can include application servers configured to implement and execute CRM software applications as well as provide related data, code, forms, web pages and other information to and from user systems 12 and to store to, and retrieve from, a database system related data, objects and web page content. With a multi-tenant system, tenant data is preferably arranged so that data of one tenant is kept separate from that of other tenants so that one tenant does not have access to another's data, unless such data is expressly shared.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs an HTTP client, e.g., a browsing program, such as Microsoft's Internet Explorer browser, Mozilla.org's Firefox™ browser, Google's Chrome browser, Opera's browser, or a WAP-enabled browser in the case of a cell phone, PDA or other wireless device, or the like, allowing a user (e.g., subscriber of a CRM system) of user system 12 to access, process and view information and pages available to it from MTS 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms and other information provided by MTS 16 or other systems or servers. As discussed above, the exemplary systems are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium processor or the like. Similarly, MTS 16 (and additional instances of MTS's, where more than one is present) and all of their components might be operator configurable using application(s) including computer code run using a central processing unit such as an Intel Pentium processor or the like, or multiple processor units. Computer code for operating and configuring MTS 16 to intercommunicate and to process web pages and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, Java, JavaScript, any other scripting language, such as VBScript and many other programming languages as are well known.

According to one embodiment, each MTS 16 is configured to provide web pages, forms, data and media content to user systems 12 to support the access by user systems 12 as tenants of MTS 16. As such, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., RDBMS) as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

FIG. 2 illustrates elements of MTS 16 and various interconnections in more detail. In this example, the network interface is implemented as one or more HTTP application servers 100. Also shown is system process space 102 including individual tenant process spaces 104, a system database 106, tenant database(s) 108 and a tenant management process space 110. Tenant database 108 might be divided into individual tenant storage areas 112, which can be either a physical arrangement or a logical arrangement. Within each tenant storage area 112, user storage 114 might similarly be allocated for each user.

It should also be understood that each application server 100 may be communicably coupled to database systems, e.g., system database 106 and tenant database(s) 108, via a different network connection. For example, one server 1001 might be coupled via the Internet 14, another server 100N-1 might be coupled via a direct network link, and another server 100N might be coupled by yet a different network connection. Transfer Control Protocol and Internet Protocol (TCP/IP) are preferred protocols for communicating between servers 100 and the database system, however, it will be apparent to one skilled in the art that other transport protocols may be used to optimize the system depending on the network interconnect used.

In preferred aspects, each application server 100 is configured to handle requests for any user/organization. Because it is desirable to be able to add and remove application servers from the server pool at any time for any reason, there is preferably no server affinity for a user and/or organization to a specific application server 100. In one embodiment, therefore, an interface system (not shown) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as round robin and observed response time, also can be used. For example, in certain aspects, three consecutive requests from the same user could hit three different servers, and three requests from different users could hit the same server. In this manner, MTS 16 is multi-tenant, wherein MTS 16 handles storage of different objects and data across disparate users and organizations.

As an example of storage, one tenant might be a company that employs a sales force where each salesperson uses MTS 16 to manage their sales process. Thus, a user might maintain contact data, leads data, customer follow-up data, performance data, goals and progress data, etc., all applicable to that user's personal sales process (e.g., in tenant database 108). In the preferred MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's sales data might be separate from other users' sales data regardless of the employers of each user, some data might be organization-wide data shared or accessible by a plurality of users or all of the sales force for a given organization that is a tenant. Thus, there might be some data structures managed by MTS 16 that are allocated at the tenant level while other data structures might be managed at the user level. Because an MTS might support multiple tenants including possible competitors, the MTS should have security protocols that keep data, applications and application use separate. Also, because many tenants will opt for access to an MTS rather than maintain their own system, redundancy, up-time and backup are more critical functions and need to be implemented in the MTS.

In addition to user-specific data and tenant-specific data, MTS 16 might also maintain system level data usable by multiple tenants or other data. Such system level data might include industry reports, news, postings, and the like that are sharable among tenants.

In certain aspects, client systems 12 communicate with application servers 100 to request and update system-level and tenant-level data from MTS 16 that may require one or more queries to database system 106 and/or database system 108. MTS 16 (e.g., an application server 100 in MTS 16) generates automatically one or more SQL statements (the SQL query) designed to access the desired information.

In a system as described above, a very large number of automated test procedures may be used. The automated tests validate and verify the behavior of the system as it is developed. In addition, existing tests provide valuable regression coverage to ensure that extensions, bug fixes, and other modifications do not break existing functionality. However, many existing tests may be applicable to new features and new configurations, so a framework is provided to support reuse and extensibility of automated test procedures for a variety of configurations.

Figure 3:
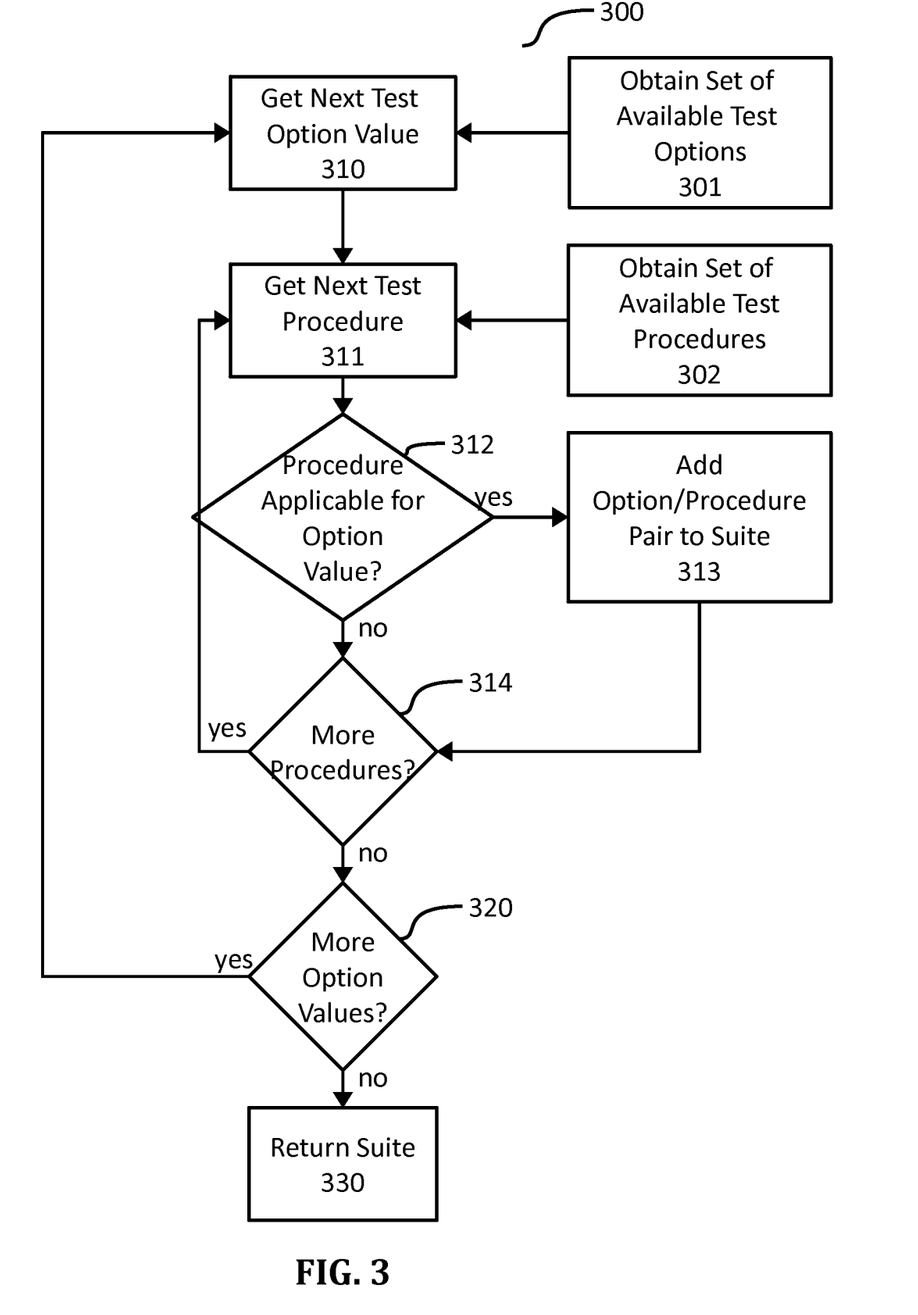
FIG. 3 illustrates a method for examining the applicability of a plurality of automated test procedures for a plurality of test options according to one embodiment.

FIG. 3 shows an exemplary method 300 for automated software testing. At step 301, a set of available test options is obtained. The test option generally comprises data describing different features, data, or other configurations used to select which test procedures to use and/or as a parameter to direct the execution of a test procedure. For example, a set of test options may correspond to various subclasses of a parent class in an object-oriented programming system. Alternately, the test options by correspond to different report types, display options, or other configurations to be tested. The test options may be obtained from a database, configuration file, or other data source. The test options may also be "hard coded" in a programming language.

At step 302, a set of available test procedures are obtained. Each test procedure may have associated with it data, code, or other means to associate it with one or more of the test options. The set of test procedures may be obtained from a database, configuration file, or other data source. The set of test procedures may also be "hard coded" in a programming language. In a preferred embodiment, the test procedures may be obtained using the Java reflection API to obtain a list of methods in an object.

In steps 310-320, the method "loops through" each of the available test option values. In steps 311-314, the method executes a nested loop through each of the available test procedures. Thus, the method traverses all combinations of test option and test procedure. It will be recognized that nesting of loops may be reversed, or other traversal methods familiar to those skilled in the art, may be applied to equal effect. Within the loops, at step 312, the current test option is compared to the current test procedure to determine whether the procedure is applicable for the option.

Figure 4:
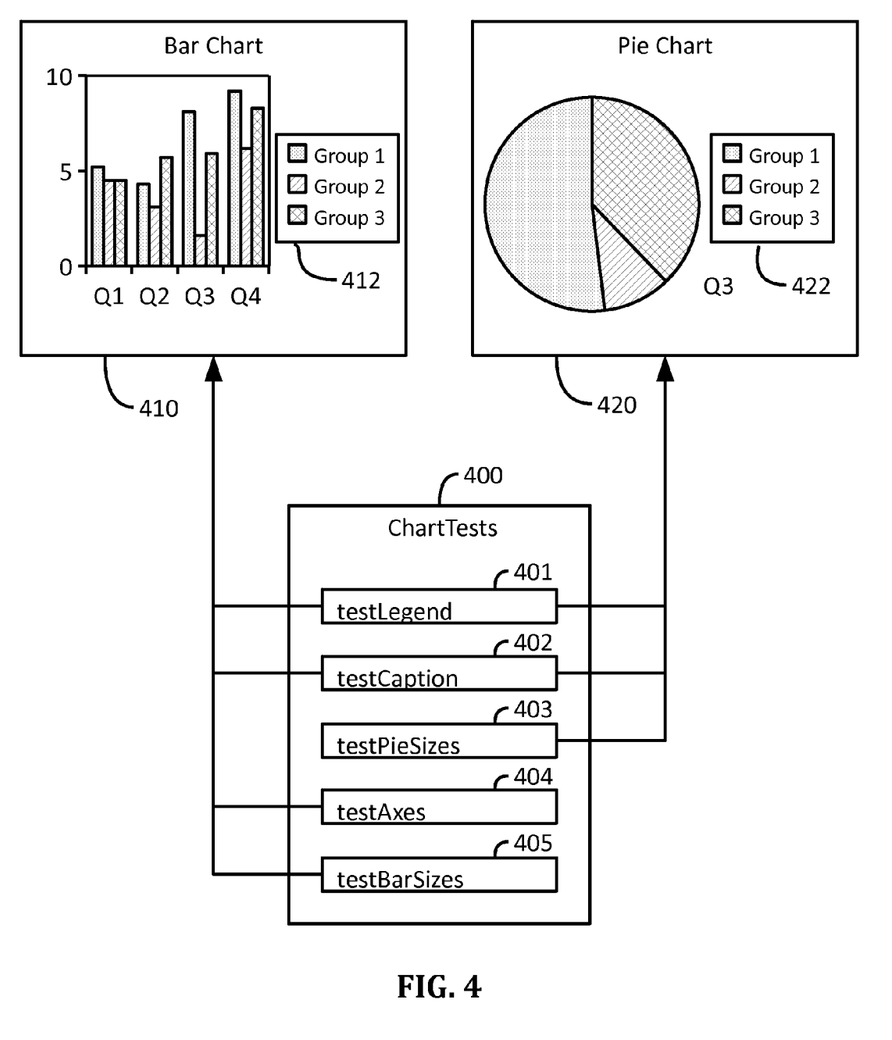
FIG. 4 illustrates two chart types and a software object having a plurality of automated test procedures applicable to one or both chart types according to an exemplary embodiment.

For example, the MTS of FIGS. 1 and 2 may present reports with similar but different chart options. FIG. 4 shows exemplary charts Bar Chart 410 and Pie Chart 420. ChartTestMethods object 400 has test procedures 401-402. Bar Chart 410 and Pie Chart 420 are both chart objects that may be tested by methods 401-405. Thus, at step 301, the method may obtain two available test options corresponding to the two chart types, and at step 302 the method may obtain references to methods 401-405. At step 312; the method may determine that "testLegend" method 401 is applicable to both Bar Chart 410 and Pie Chart 420 to test legends 412 and 422. Step 312 may also determine that "testCaption" method 402 is also applicable to both charts 410 and 420, while "testPieSizes" method 403 is only applicable to Pie Chart 420 and "testAxes" method 404 and "testBarSizes" method 405 is applicable only to Bar Chart 410.

For each method that is applicable to a test option, at step 313 the option/procedure pair may be saved as a "test specification" and added to a suite of test specifications to be executed. At step 330, after each combination has been evaluated, the suite may be returned.

Figure 5:
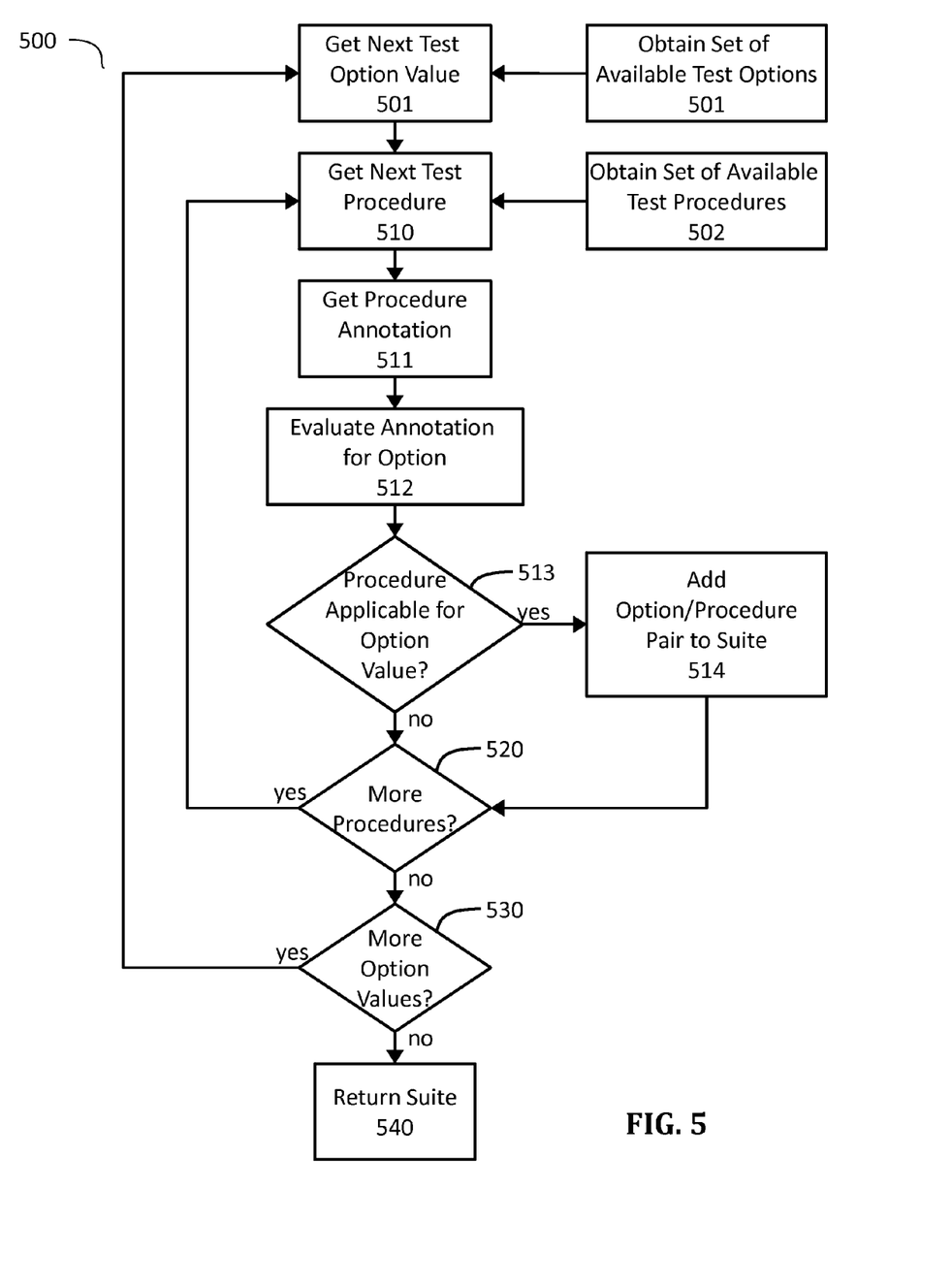
FIG. 5 illustrates another method for examining the applicability of a plurality of automated test procedures for a plurality of test options using procedure annotations according to one embodiment.

FIG. 5 shows another exemplary method 500. Similar to the method 300 in FIG. 3, at step 501, a set of available test options is obtained, and a set of available test procedures are obtained at step 502. Steps 501-530 loops through each of the available test option values and steps 510-520 execute a nested loop through each of the available test procedures. Thus, steps 511-514 are executed for each combination of test option and test procedure.

At step 511, the method obtains an "annotation" for the current procedure. In the Java programming language, annotations provide data about a program that is not part of the program itself. They generally have no direct effect on the operation of the code they annotate, although some annotations are available to be examined at runtime. The automated testing procedures (e.g., procedures 401-405 in FIG. 4) may each include one or more annotations which may define the test options or other conditions for which the procedure is applicable. Thus, at step 512 the annotation may be evaluated for the current test options (e.g., the test option value or a derivative thereof may be passed to a procedure defined by the annotation implementation). At step 513 the result of the annotation evaluation examination is evaluated to determine whether the current procedure is applicable for the current test option. If so, then at step 514 the option/procedure pair (e.g., a "test specification") may be added to the suite of test specifications to be executed. After loops 501-530 and 510-520 are complete, the method returns the suite of test specifications at step 540.

Figure 6:
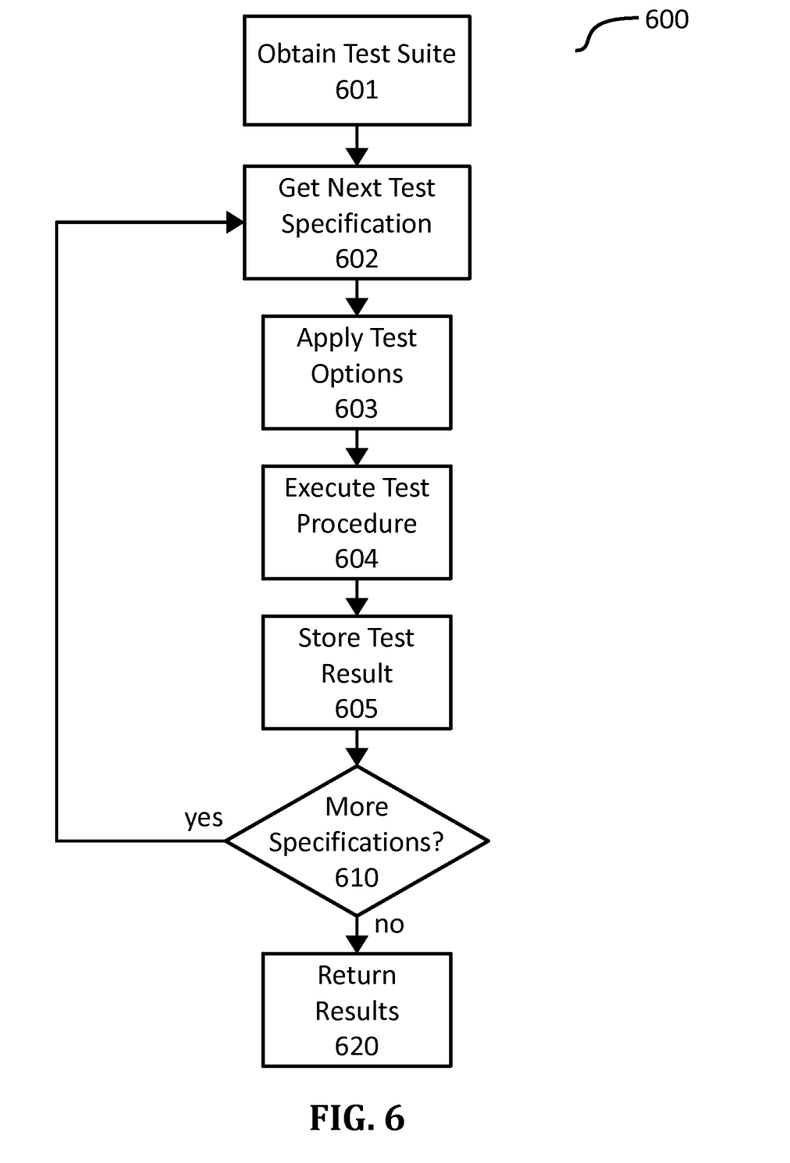
FIG. 6 illustrates a method for executing automated test procedures according to one embodiment.

FIG. 6 shows an exemplary method 600 for executing automated test procedures. At step 601 the method obtains a test suite (e.g., a set of test specifications including test option/procedure pairs). Steps 602-610 loop through the set of test specifications. At step 603, the test option value of the current test specification is applied (e.g., by setting an option value in an object, passing the test option value as a parameter to the test procedure, etc.). At step 604, the test procedure is executed with respect to the test option value. For example, referring again to FIG. 4, "testCaption" procedure 402 may verify a caption location in different locations for Bar Chart 410 and Pie Chart 420. In some cases, the test procedure may operate identically for all option values. For example, "testLegend" procedure 401 may perform the same tests for Bar Chart legend 412 and Pie Chart legend 422. At step 605, the test results are stored for later analysis. After the conclusion of loop 602-610, the method returns all of the results at step 620.

Figure 7:
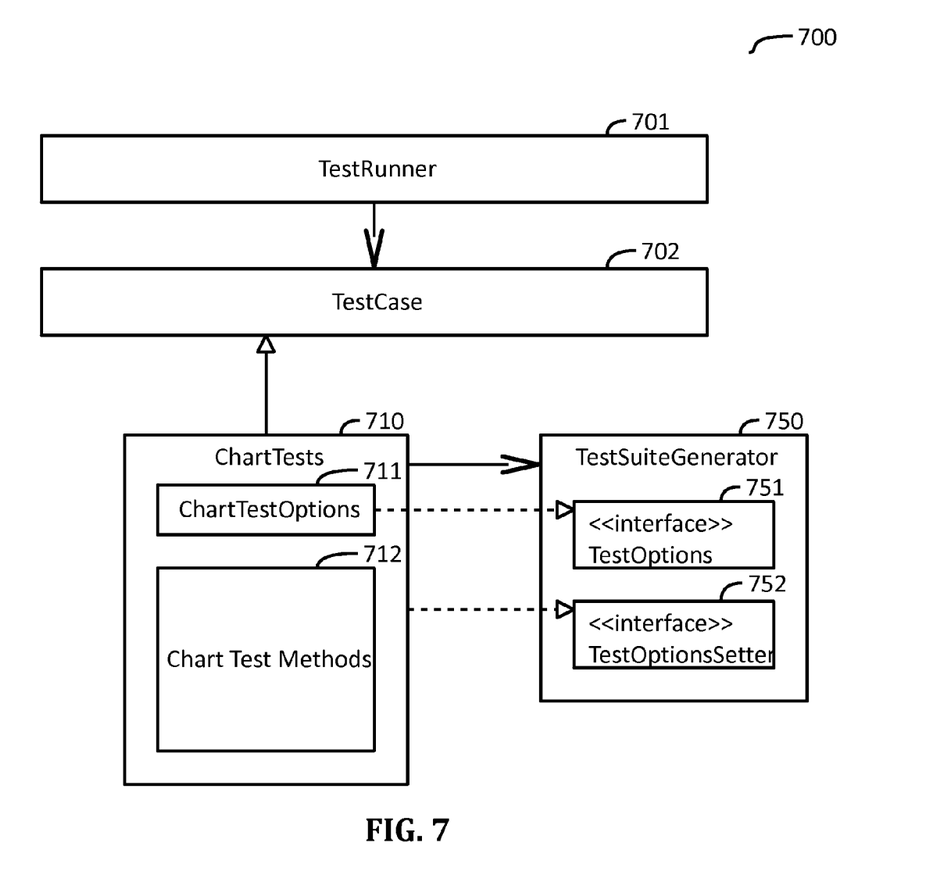
FIG. 7 illustrates an exemplary framework for examining the applicability of a plurality of automated test procedures for a plurality of test options and for executing automated test procedures according to one embodiment.

FIG. 7 shows an exemplary framework 700 for automating test procedures according to the present invention. Framework 700 is based on the JUnit framework for unit testing in the Java programming language. JUnit provides a TestCase class 702 which defines a fixture to run multiple tests. To define a test case a test developer implements a subclass of TestCase and defines instance variables that store the state of the fixture. JUnit also provides a TestSuite class for collecting tests to be run. JUnit provides different test runners (e.g. TestRunner 701) which can run a test suite and collect the results. A test runner either expects a static method "suite" as an entry point to get a test to run or it will extract the suite automatically.

Framework 700 includes a test suite generator 750 configured to generate a suite of test specifications. The test specifications include option data corresponding to one of a set of test options and procedure data corresponding to a test procedure. In this exemplary embodiment, test suite generator 750 defines a test option interface 751 for the generic description of test options which a suite will depend upon. The framework will use this interface to get the test options available for a suite. A test options setter interface 752 is also defined to pass test option data to the test suite procedures at runtime.

ChartTests object 710 extends (directly or indirectly) the JUnit TestCase class to provide a plurality of methods 712 for testing charts. ChartTests object 710 defines ChartTestOptions 711 as an implementation of the generic TestOptions interface 751. ChartTests object 710 also implements the generic TestOptionsSetter interface 752 to receive test option data at runtime.

In general, the JUnit TestRunner 701 is provided reference to one or more TestCase objects such as ChartTests object 710. TestRunner 701 attempts to call a static "suite" method on the TestCase object to obtain a plurality of TestCase instances to run. The operation of framework 700 after the "suite" method is executed on ChartTests object 720 will now be described with respect to method 500 of FIG. 5. At step 501, ChartTests object 710 calls a "makeSuite" method on TestSuiteGenerator 750. ChartTests 710 also passes a reference to itself. At step 502, TestSuiteGenerator 750 uses the Java reflection API to obtain a list of methods ChartTests object 710 and selects all of the methods whose names begin with "test."

In steps 501-530 TestSuiteGenerator 750 loops through each of the available test option values and at steps 510-520 TestSuiteGenerator 750 executes a nested loop through each of the ChartTestMethods 712. Thus, steps 511-514 are executed for each combination of test option and test procedure.

At step 511, TestSuiteGenerator 750 obtains a Java annotation object for the current procedure using the Java Annotation API. At step 512 TestSuiteGenerator 750 evaluates the annotation for the current test options (e.g., the test option value or a derivative thereof may be passed to a procedure defined by the annotation implementation). At step 513 TestSuiteGenerator 750 examines the result of the annotation evaluation to determine whether the current procedure is applicable for the current test option. If so, then at step 514 the option/procedure pair (e.g., a "test specification") may be added to a suite of test specifications to be executed. The JUnit TestSuite API supports groups of TestCase object instances rather than option/procedure pairs. Therefore, in a preferred embodiment TestSuiteGenerator 750 may create an instance of the ChartTests object, add that instance to the JUnit TestSuite, and map that instance (e.g., using a Java HashMap object) to the option/procedure pair (e.g., using a Java Pair object). After loops 501-530 and 510-520 are complete, at step 540, TestSuiteGenerator 750 returns the TestSuite to the static ChartTests "suite" method, which may then return the TestSuite to TestRunner 701.

After generating the suite of TestCase objects (in this case, ChartTests object instances), TestRunner 701 may proceed to execute the tests. The operation of framework 700 to execute the tests will now be described with respect to method 600 of FIG. 6. Step 601 of obtaining a test suite corresponds to the test suite generation methods described herein. TestRunner 701 may then call a "runTests" method on the JUnit TestSuite object which now contains a plurality of instances of ChartTests 710. The TestSuite iterates over the set of ChartTests 710 instances in loop 602-610. At step 602, the TestSuite calls a "runTest" method on the ChartTests 710 instance, when then calls a "runTest" method on TestSuiteGenerator 750. TestSuiteGenerator 750 obtains the option/procedure pair associated with the instance of ChartTests 710. At step 603, TestSuiteGenerator uses the TestOptionsSetter interface 752 implemented by ChartTests 710 to set the current test option, and then executes the test procedure implemented by ChartTests 710. At step 605, the result of the test procedure execution is stored using a JUnit TestResult object.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of reusing automated test procedures in a computer processing system, the method comprising:
  obtaining a plurality of available automated test procedures by calling a static method on a TestCase object to obtain a plurality of methods for testing, the available automated test procedures comprising existing tests that may be applicable to new features or new configurations;
  obtaining a plurality of test options to be tested, each option of the plurality of test options comprising option data including an option value; and
  for each combination of a current option of the plurality of test options and a current procedure of the plurality of available automated test procedures:
    obtaining, by a test suite generator, an annotation for the current procedure, the annotation defining test options or other conditions for which the current procedure is applicable, wherein the annotation does not affect operation of the current procedure;
    evaluating, by the test suite generator, the annotation with respect to the option data corresponding to the current option to determine whether the current procedure is applicable for the current option; and
    if the current procedure is applicable for the current option:
      generating a test specification corresponding to the combination of the current option and the current procedure, the test specification comprising the option data corresponding to the current option and procedure data corresponding to the current procedure;
      adding the test specification corresponding to the combination of the current option and the current procedure to a suite of test specifications to be executed, wherein execution of the test specification results in the procedure data corresponding to the current procedure being executed with respect to the option value of the current option, wherein generating the test specification comprises:
        creating an instance of the TestCase object corresponding to the current procedure; and
        mapping the instance of the TestCase object to the option data and the current procedure data; and
      execution of the test specification comprises:
        setting a current test option of the instance of the TestCase object to the option value; and
        executing the current procedure implemented by the TestCase object.

2. The method of claim 1, wherein obtaining the plurality of available test procedures comprises searching for procedure implementations in a software object.

3. The method of claim 1, wherein each of the test options comprises a type of software object to test.

4. The method of claim 3, wherein generating the plurality of test specifications comprises determining which of the available automated test procedures are applicable to each of the types of software objects to test.

5. The method of claim 1, wherein the plurality of test options comprise the new features or the new configurations.

6. The method of claim 1, wherein the plurality of test options comprise extensions, bug fixes, and modifications.

7. The method of claim 1, wherein the plurality of test options correspond to types of reports generated by a multi-tenant database system.

8. The method of claim 1, wherein the plurality of test options correspond to per-tenant configurable options.

9. The method of claim 1, further comprising:
  selecting the test specification from the suite;
  obtaining the option value corresponding to the option associated with the selected test specification; and
  executing the procedure data associated with the selected test specification, wherein the procedure data uses the option value to return a test result.

10. The method of claim 1, wherein:
  the plurality of available automated test procedures comprise a plurality of methods for testing charts; and
  the plurality of test options comprise different chart types.

11. The method of claim 1, wherein:
  the option value comprises a parameter to direct the execution of the procedure data; and
  the execution of the procedure data comprises passing the option value as the parameter to the current procedure at runtime.

12. The method of claim 1, wherein:
  generating the test specification comprises:
    creating an instance of a test object corresponding to the current procedure; and
    mapping the instance of the test object to the option data and the procedure data; and
  execution of the test specification comprises:
    setting a current test option of the instance of the test object to the option value; and
    executing the current procedure implemented by the test object.

13. The method of claim 1, wherein each option of the plurality of test options comprises a subclass of a parent class in an object-oriented programming system.

14. The method of claim 1, wherein each option of the plurality of test options comprises a different report type or display option.

15. A multi-tenant on-demand database system comprising processing hardware and storage, wherein the processing hardware is configured to:
  obtain a plurality of available automated test procedures by calling a static method on a TestCase object to obtain a plurality of methods for testing, the available automated test procedures comprising existing tests that may be applicable to new features or new configurations;
  obtain a plurality of test options to be tested, each option of the plurality of test options comprising option data including an option value; and
  for each combination of a current option of the plurality of test options and a current procedure of the plurality of available automated test procedures:
    obtain an annotation for the current procedure, the annotation defining test options or other conditions for which the current procedure is applicable, wherein the annotation does not affect operation of the current procedure;
    evaluate the annotation with respect to the option data corresponding to the current option to determine whether the current procedure is applicable for the current option; and
    if the current procedure is applicable for the current option:
      generate a test specification corresponding to the combination of the current option and the current procedure by creating an instance of the TestCase object corresponding to the current procedure and mapping the instance of the TestCase object to the option data and the current procedure data, the test specification comprising the option data corresponding to the current option and procedure data corresponding to the current procedure;

add the test specification corresponding to the combination of the current option and the current procedure to a suite of test specifications to be executed, wherein execution of the test specification comprises setting a current test option of the instance of the TestCase object to the option value and executing the current procedure implemented by the TestCase object, and execution of the test specification results in the procedure data corresponding to the current procedure being executed with respect to the option value of the current option.

16. A non-transitory media capable of storing program code executable by a computer processing system to:

obtain a plurality of available automated test procedures by calling a static method on a TestCase object to obtain a plurality of methods for testing, the available automated test procedures comprising existing tests that may be applicable to new features or new configurations;

obtain a plurality of test options to be tested, each option of the plurality of test options comprising option data including an option value; and generate a suite of test specifications to be executed by:
for each combination of a current option of the plurality of test options and a current procedure of the plurality of available automated test procedures:
obtaining an annotation for the current procedure, the annotation defining test options or other conditions for which the current procedure is applicable, wherein the annotation does not affect operation of the current procedure;
evaluating the annotation with respect to the option data corresponding to the current option to determine whether the current procedure is applicable for the current option; and
if the current procedure is applicable for the current option:
generating a test specification corresponding to the combination of the current option and the current procedure, the test specification comprising the option data corresponding to the current option and procedure data corresponding to the current procedure;
adding the test specification corresponding to the combination of the current option and the current procedure to the suite of test specifications, wherein execution of the test specification results in the procedure data corresponding to the current procedure being executed with respect to the option value of the current option, wherein:
generating the test specification comprises:
creating an instance of the TestCase object corresponding to the current procedure; and
mapping the instance of the TestCase object to the option data and the current procedure data; and
execution of the test specification comprises:
setting a current test option of the instance of the TestCase object to the option value; and
executing the current procedure implemented by the TestCase object.

17. The non-transitory media of claim 16, wherein the program code is executable by the computer processing system to evaluate the annotation with respect to the option to determine whether the procedure is applicable for the option by comparing a name of the procedure to a value of the option.

18. The non-transitory media of claim 16, wherein the program code is executable by the computer processing system to obtain the plurality of available test procedures by searching for procedure implementations in a software object.

19. The non-transitory media of claim 16, wherein:
the computer processing system comprises a multi-tenant on-demand database system; and
the plurality of test options correspond to types of reports generated by the multi-tenant on-demand database system.

20. The non-transitory media of claim 16, wherein:
the computer processing system comprises a multi-tenant on-demand database system; and
the plurality of test options correspond to per-tenant configurable options.

\* \* \* \* \*